Jan. 6, 1970   HISAO KANAMORI   3,487,871
METHOD OF JOINING CONVEYER BELTS HAVING STEEL
CORDS EMBEDDED THEREIN
Filed Sept. 7, 1966   2 Sheets-Sheet 1

INVENTOR.
HISAO KANAMORI
BY
ATTORNEY

United States Patent Office 3,487,871
Patented Jan. 6, 1970

3,487,871
METHOD OF JOINING CONVEYER BELTS HAVING STEEL CORDS EMBEDDED THEREIN
Hisao Kanamori, Kobe, Japan, assignor to Mitsubashi Belt Kabushiki Kaisha, Kobe, Japan, a Japanese company
Filed Sept. 7, 1966, Ser. No. 577,693
Int. Cl. B32b 31/20
U.S. Cl. 156—266
19 Claims

ABSTRACT OF THE DISCLOSURE

The method of joining the ends of conveyer belts having steel cords or strands embedded therein, the conveyer belt ends being joined by removing portions of the belt adjoining the ends to expose the strands, placing the exposed strands in grooves of a first rubber plate wherein at least the grooved portion is formed of a semi-vulcanized rubber, applying a second plate in overlying relationship and then bonding the plates one to the other to the belt and to the strands by the application of heat and pressure.

---

This invention relates to the joining of conveyer belts having steel cords or strands embedded in a sheath of rubber or other similar material and more specially concerns a novel and improved method for quickly and easily forming a strong durable joint in conveyer belts.

Conveyer belts are widely utilized in many industries for the conveyance of materials and are generally formed of rubber or other similar materials. While small conveyer belts are fabricated principally of rubber, larger conveyer belts embody steel cords or strands embedded therein.

In the fabrication of large conveyer belts embodying reinforcing steel strands embedded in a rubber body, it is of course desirable to arrange the strands in a coplanar relationship parallel to the surfaces of the belt so that expansion of the steel strands will be uniform and will not cause the belt to weave and thus produce material damage. The joinder of belt ends wherein steel strands are embedded within the body has presented a serious problem and this invention provides a novel and improved method for joining belt ends that will afford substantial strength and at the same time be completely continuous with the main body of the belt.

Another object of the invention resides in the provision of a novel and improved method for joining conveyer belts having steel strands embedded therein which affords a uniform balanced joint of high strength and which will not produce discontinuities that will cause the belt to weave during operation.

Still another object of the invention resides in the provision of a novel and improved method of joining conveyer belt ends having steel strands embedded therein wherein the steel strands are substantially uniformly arranged within the joint so that the belt joint has substantially the same physical characteristics as the remainder of the belt.

A still further object of the invention resides in a novel and improved method of joining conveyer belt ends that can be effected quickly and easily and at the same time produce an efficient precise joint.

The method of joining conveyer belt ends in accordance with the invention involves the utilization of coupling elements of vulcanized or nonvulcanized rubber which are arranged to accommodate the steel strands extending from the belt ends in such a manner that a uniform balanced joint is produced.

The above and other objects of the invention will become more apparent from the following description and accompanying drawings forming part of this application.

Figure 1:
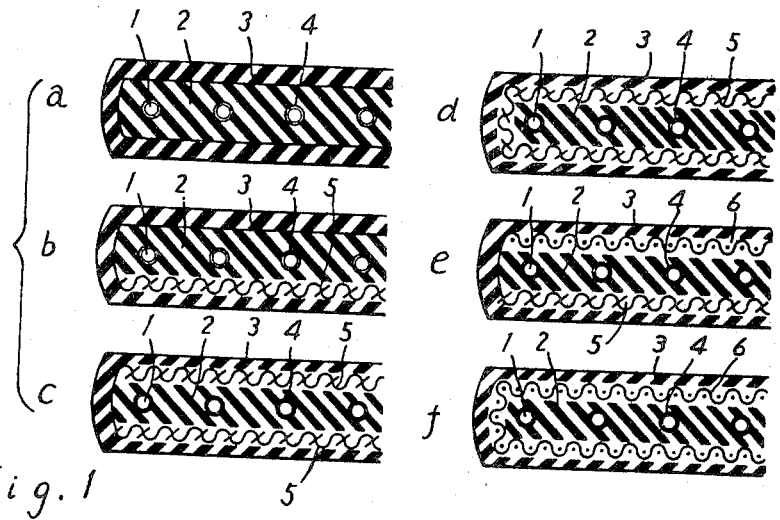
FIGURE 1a through 1f are fragmentary cross-sectional views of belt structures having steel strands embedded therein which belts may have their ends joined in accordance with the invention.

Referring now to the drawings and more specifically to FIGURES 1a through 1f, it will be observed that the several forms of conveyer belts utilize a plurality of steel cords or strands 1 embedded in a core layer of rubber 2 with each of the strands being coated with a rubber bonding layer 4. This bonding layer facilitates bonding of the steel strands firmly to the rubber core. The core of each belt is then provided with an outer rubber cover 3. In addition to the baisc belt structure as shown, for instance, in FIGURE 1a, the belt may include one or more rubber impregnated canvas layers 5 inserted between the core layer 2 and the cover layer 3 as shown in FIGURES 1b, 1c, and 1d. FIGURE 1e includes a rubber impregnated canvas layer 5 and a synthetic fiber canvas layer 6 impregnated with a cushioning rubber. The belt shown in FIGURE 1f includes synthetic fiber canvas layers 6 impregnated with cushioning rubber on each side of the core. It will become apparent from the following description that the belt end joining method in accordance with the invention is equally applicable to many forms of conveyer belts having steel strands embedded therein.

Preparation of the belt ends to be joined is illustrated in FIGURE 2a. The belt end 10 has a portion of the body, denoted herein by the numeral 3, removed to expose the steel strands 1. For convenience, the body 3 of FIGURE 2a is intended to include all body elements of the belt such as the core 2, outer layer 3 and layers 5 and 6 as shown in FIGURES 1a through 1f inclusive. The body 3 is removed so that the edge of the body forms an angle alpha with reference to the length of the belt of about 70°. It is also desirable in removing a portion of the rubber body 3 to expose the strands 1 to provide an offset between the upper and lower halves of the belt so that the upper face 11 is set back from the lower face 12 as shown in the drawing. This produces a so-called stepped contour with the length of the step being denoted by the letter "l." In addition, it is desirable that the faces 11 and 12 be formed at an angle beta with a plane parallel to the surfaces of the belt, and the angle beta is preferably of the order of 30°. The lengths of the exposed steel strands 1 are adjusted so that they are of different lengths, that is, the ends of the strands are offset so that they all do not terminate in the same plane. The strands are also cleaned to remove rubber adhering thereto, and for this purpose, a solvent such as toluene may be utilized. After the strands are cleaned, a bonding agent comprising a 3:2 mixed solution of "Chemlock No. 203" and xylene, for example, and rubber cement is applied to the strands and dried.

After the preparation of both belt ends as described in connection with FIGURE 2a, a joining member 13 is formed as illustrated in FIGURE 2b. This member may be made of vulcanized or semi-vulcanized rubber of the same quality as the rubber used in the formation of the belt body. The upper face of the member 13 is preferably formed of a nonvulcanized rubber and provided with a plurality of strand receiving grooves 14. In the instant embodiment of the invention, the number of grooves 14 is equal to twice the number of steel strands 1 in the belt 10, the ends of which are to be joined with a corresponding belt end and the spacing between the grooves is one-half of the spacing between the steel strands. In addition, the end faces 15 and 16 are formed with an angle beta of about 30° and these angles have a slope reversed with respect to the slope of the end 12 of the belt body 10 to provide a triangularly shaped gap when the member 13 is placed in engagement with the strands 1.

Figure 2:
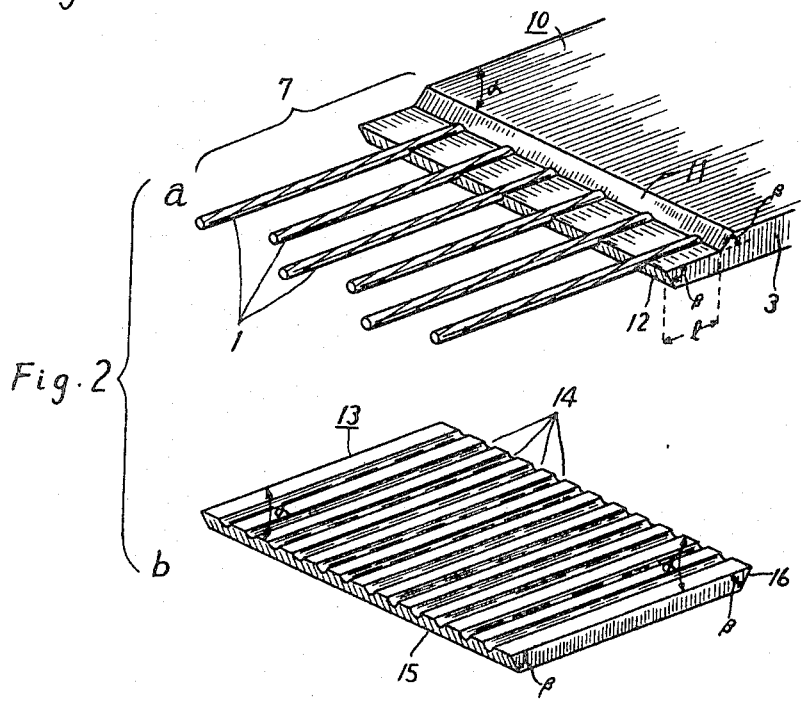
FIGURES 2a and 2b are perspective views of a belt end prepared for attachment to a corresponding belt end and one of the joining elements used in the formation of the joint.

The grooves 14 in the illustrated embodiment of the invention are approximately semi-circular in section to accommodate at least half of the steel strands 1. Since the plate 13 as shown in FIGURE 2 and the cooperating plate 19 shown in FIGURE 3 are preferably formed of a semi-vulcanized rubber with nonvulcanized meeting surfaces, only one of the plates such as the plate 13 may be grooved and the other of the plates may be flat.

Figure 3:
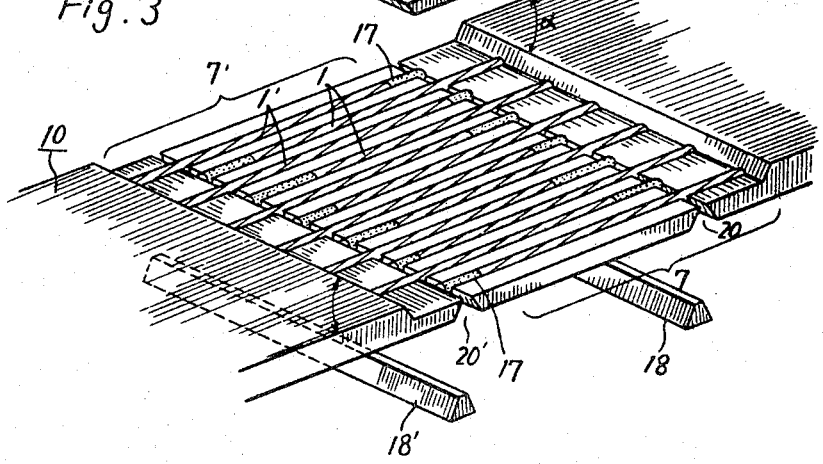
FIGURE 3 is an exploded perspective view of two belt ends and the joining members in accordance with one embodiment of the invention.

Referring now to FIGURE 3, the botton plate 13 is shown in engagement with the strands 1 and 1' of the belt ends 10 and 10' being connected. The end portions 7 and 7' of the strands 1 and 1' are mutually interlaid in the grooves 14. Since the strands 1 and 1' have been cut at varying lengths, it is desirable to fill the spaces between the end of each strand and the body of the opposing belt end with rubber cores or fillers 17 which are equal to or slightly larger in diameter than the steel strands. In this way, a more uniform bending characteristic is provided for the joint.

The specific arrangement of the steel strands 1 and 1' as shown, for instance, in FIGURE 3 may be varied. For instance, outer groups of strands of each belt end may be arranged to engage the same grooves 14 in the plate 13. Under these conditions opposing strands of said outer groups from each belt end 10 and 10' are cut so that their total length is slightly less than the length of the joint and lie in a single groove in abutting relationship. At the same time, the central group of strands may be interlaid in the manner shown in FIGURE 3. Thus, a wide variety of strand arrangements may be utilized embodying the instant invention. In the arrangement wherein outer groups of strands are placed in mutually opposing relationship, it is desirable that the spacing between the abutting ends of opposing strands be from 0.5 to 5 times the diameter of the strand. In any of the above arrangements, it is especially desirable that the strands be aligned within the joint in a direction of the belt length and substantially uniformly spaced. The particular number of grooves 14 in the bonding member 13 should correspond with the number of strands to be accommodated.

After the two belt ends 10 and 10' are assembled as shown in FIGURE 3, the upper plate of nonvulcanized or semivulcanized rubber is placed over the steel strands 1 and 1'. In addition, triangular strips 18 and 18' of rubber are placed in the gaps 20 and 20' formed between the plate 13 and the adjoining body portions of the belt ends 10 and 10'. A bonding agent of the type described above is preferably coated on the faces of the nonvulcanized materials 18 and 18' and on the end faces 12 and 12' and 15 and 16 and such other surfaces as may be necessary to insure complete bonding.

Figure 4:
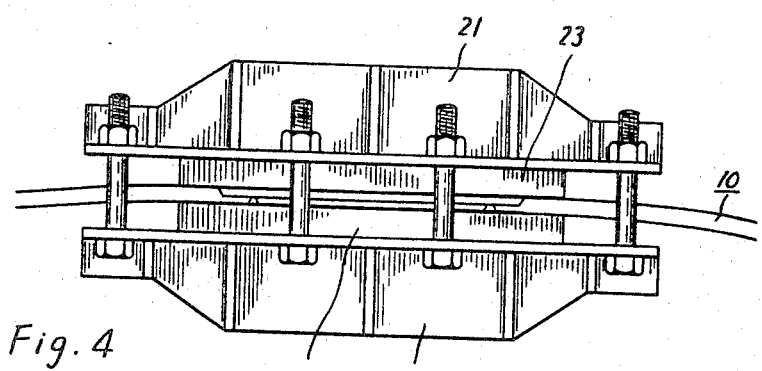
FIGURE 4 is a side elevational view of a vulcanizing press for forming a belt joint in accordance with the invention.

With the joint assembled as described above, it is placed within a vulcanizing press shown in FIGURE 4. This press has upper and lower members 21 and 22 respectively each having a heated member 23 between which the joint is pressed, The heated pressure plates or molds 23 extend beyond the joint itself and preferably for at least 100 mm. beyond the actual ends of the joint. In practice, the joint portion is placed in the press and subjected to pressure before the plates 23 are heated from normal temperature to approximately 100° C. When the pressure to which the joint is subjected is of the order of 7 kg./cm.², the temperature range should be of the order of 100° C. to 120° C. When a pressure of the order of 12 kg./cm.² is employed, the temperature should preferably be in the order of 135° to 145° C. Under the foregoing conditions, the steel strands 1 and 1', the bonding members 13 and 19, and the filler elements 18 and 18' are all bonded one to the others and to the bodies of the belt ends 10 and 10'.

With the joining method as described above, the steel strand arrangement is maintained through the use of the bonding member 13 having strand receiving grooves formed therein. As a result, the steel strands are maintained in a regular arrangement at the joint portion and this prevents weaving and damage to the belt. Furthermore, irregularity at the joint portion is substantially eliminated, and excellent operating characteristics of the belt are obtained. In addition, the bonding member 13 acts as a jig for the steel strand arrangement, and as a result, the bonding operation can be quickly, easily and precisely effected.

The embodiment of the invention shown in the drawings is for the purpose of describing the objects and features of the present invention. It is to be understood, however, that modifications, changes and alterations may be made without departing from the scope and spirit of the invention.

What is claimed is:

1. The method of joining the ends of conveyor belts formed of rubber bodies and having steel strands embedded therein comprising the steps of removing a portion of the rubber from the belt ends to be joined to expose said strands, forming two plates of at least semi-vulcanized rubber with one of said plates having at least its upper surface formed of incompletely vulcanized rubber and with substantially parallel strand receiving grooves in said upper surface, placing the exposed strands of the belt ends being joined in the grooves of one plate, placing the second plate in overlying relationship with the first plate and bonding said plates under pressure one to the other, to said strands and to said rubber bodies.

2. The method according to claim 1 wherein the rubber is removed from each belt end so that the edge of the rubber body adjoining the exposed strands makes an angle of about 70 degrees with the axis of the strands.

3. The method according to claim 1 wherein the rubber is removed from each belt end so that the upper and lower halves of each rubber body are inclined away from the plane of said strands and at angles of about 30 degress and the resultant gap between each body end and at least said one plate is filled with a strip of nonvulcanized material prior to bonding.

4. The method according to claim 1 wherein the exposed strands of each belt end being joined are cut to nonuniform lengths.

5. The method according to claim 1 wherein at least certain of corresponding outer strands of each exposed end are placed in common plate grooves and in spaced abutting relationship, said spacing being in the range of 0.5 to 5 times the diameter of the strands.

6. The method according to claim 1 wherein the spacing between adjoining strands does not exceed twice the diameter of said strands and wherein certain of said strands are coaxially aligned.

7. The method according to claim 1 wherein said plates are bonded to said strands and rubber bodies and wherein at least 100 mm. of each of said rubber bodies is simultaneously subjected to vulcanization treatment during said bonding.

8. The method according to claim 1 wherein said plates are bonded to said strands and to said rubber bodies by vulcanization and wherein said joint is subjected to a pressure of about 7 kg./cm.² and a temperature in a range of the order of 100° C. to 120° C.

9. The method according to claim 1 wherein said plates are bonded to said strands and to said rubber bodies by vulcanization and wherein said joint is subjected to a pressure of about 12 kg./cm.² and a temperature of the order of 140° C.

10. The method according to claim 1 wherein both of said plates are formed of a semi-vulcanized rubber and wherein said plates are bonded one to the other, to said strands and to said rubber bodies by vulcanization under heat and pressure.

11. The method according to claim 10 wherein the rubber is removed from each belt end so that the edge of the rubber body adjoining the exposed strands makes an angle of about 70 degrees with the axis of the strands.

12. The method according to claim 10 wherein the rubber is removed from each belt end so that the upper and lower edge portions of each rubber body are inclined away from the plane of said strands at angles of about 30 degrees.

13. The method according to claim 12 wherein said plates are formed with end edges tapered reversely from said inclined edge portions to form resultant gaps of triangular section and strips of nonvulcanized filler material are inserted in said gaps prior to vulcanization.

14. The method according to claim 10 wherein the exposed strands of each belt end being joined are cut to nonuniform lengths.

15. The method according to claim 10 wherein at least certain of the outer strands of each exposed end are placed in common plate grooves and in spaced abutting relationship, said spacing being in the range of 0.5 to 5 times the diameter of the strands.

16. The method according to claim 10 wherein the spacing between adjoining strands does not exceed twice the diameter of said strands and wherein certain of said strands are coaxially aligned.

17. The method according to claim 10 wherein said plates are bonded to said strands and rubber bodies and wherein at least 100 mm. of each of said rubber bodies is simultaneously subjected to vulcanization treatment during said bonding.

18. The method according to claim 10 wherein said plates are bonded to said strands and to said rubber bodies by vulcanization and wherein said joint is subjected to a pressure of about 7 kg./cm.$^2$ and a temperature in a range of the order of 100° C. to 120° C.

19. The method according to claim 10 wherein said plates are bonded to said strands and to said rubber bodies by vulcanization and wherein said joint is subjected to a pressure of about 12 kg./cm.$^2$ and a temperature of the order of 140° C.

References Cited

UNITED STATES PATENTS

| | | | |
|---|---|---|---|
| 1,735,686 | 11/1929 | Kimmich | 24—38 |
| 2,182,169 | 12/1939 | Bierer | 156—258 XR |
| 3,234,611 | 2/1966 | Paasche | 24—38 |
| 3,300,826 | 1/1967 | Read | 156—157 XR |
| 3,351,508 | 11/1967 | Baxendale | 156—304 XR |

FOREIGN PATENTS

| | | |
|---|---|---|
| 977,226 | 12/1964 | Great Britain. |
| 1,048,783 | 11/1966 | Great Britain. |

HAROLD ANSHER, Primary Examiner

D. J. FRITSCH, Assistant Examiner

U.S. Cl. X.R.

24—38; 156—304, 308